Oct. 11, 1927.

C. B. JAHNKE 1,644,728

OIL FILTER

Filed Aug. 14, 1924      2 Sheets-Sheet 1

INVENTOR
CHARLES B. JAHNKE
BY Roy M Eiler
ATTORNEY

Oct. 11, 1927.
C. B. JAHNKE
1,644,728
OIL FILTER
Filed Aug. 14, 1924      2 Sheets-Sheet 2
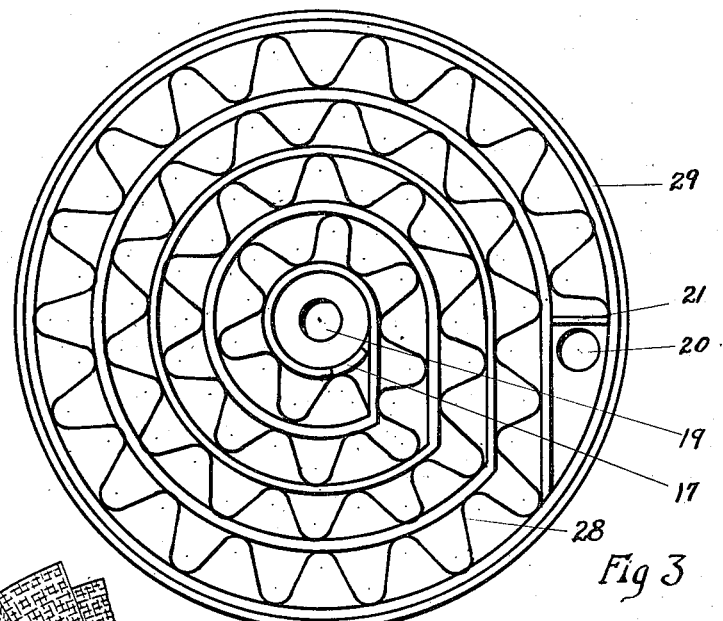
Fig 3
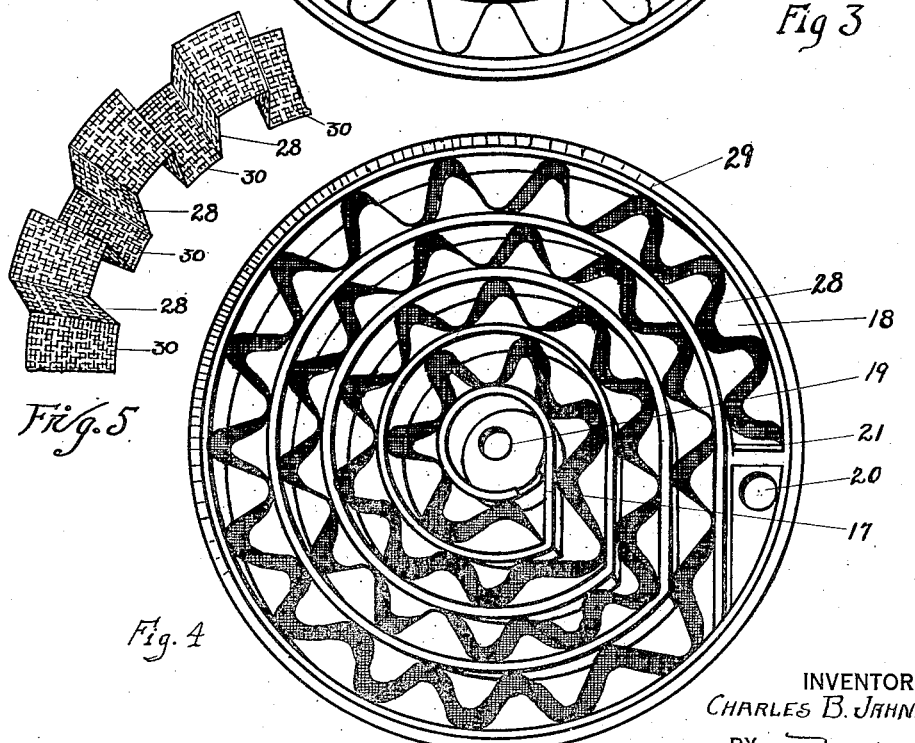
Fig. 5
Fig. 4
INVENTOR
CHARLES B. JAHNKE
BY
Roy M. Eilers
ATTORNEY Patented Oct. 11, 1927.

1,644,728

UNITED STATES PATENT OFFICE.

CHARLES B. JAHNKE, OF BELOIT, WISCONSIN, ASSIGNOR TO FAIRBANKS, MORSE & CO., OF CHICAGO, ILLINOIS, A CORPORATION OF ILLINOIS.

OIL FILTER.

Application filed August 14, 1924. Serial No. 732,032.

My invention relates to improvements in oil filters and has for its object the obtaining of an oil filter which is efficient in operation and simple and easy to construct. Another object of my invention is to provide in an oil filter a precipitating tray in which the oil is made to traverse a tortuous passage, thereby providing a maximum of precipitating surface in a minimum of space.

Although my invention consists largely in the construction and arrangement of parts hereinafter described and particularly pointed out in the claims yet I do not limit my invention to the precise form, construction or arrangement of parts shown or the several parts thereof, inasmuch as various alterations may be made without changing the scope of my invention.

Figure 1:
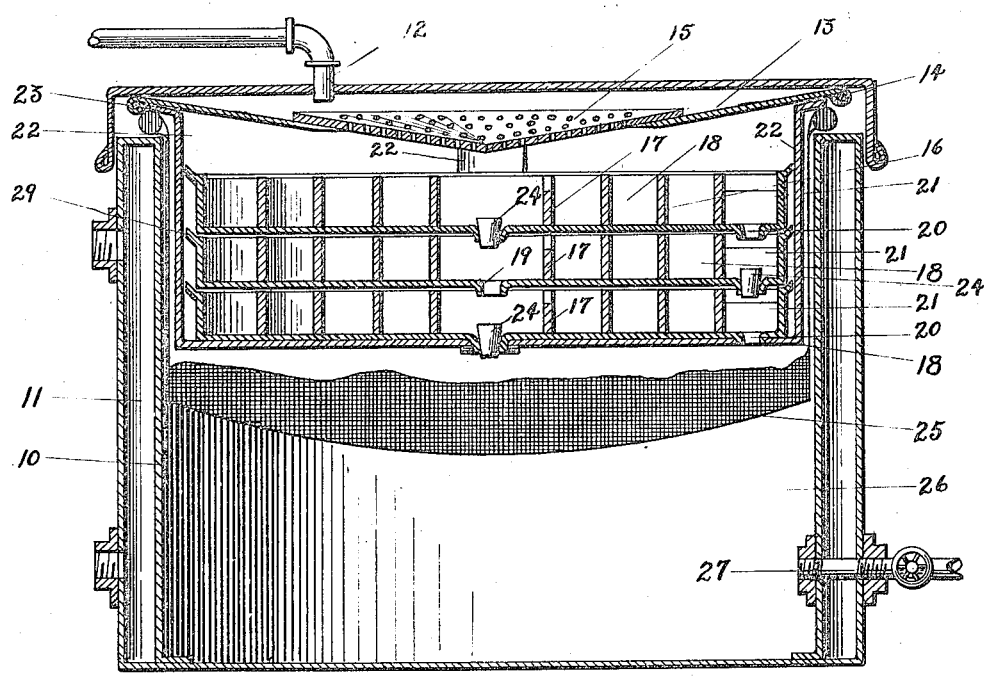
Figure 2:
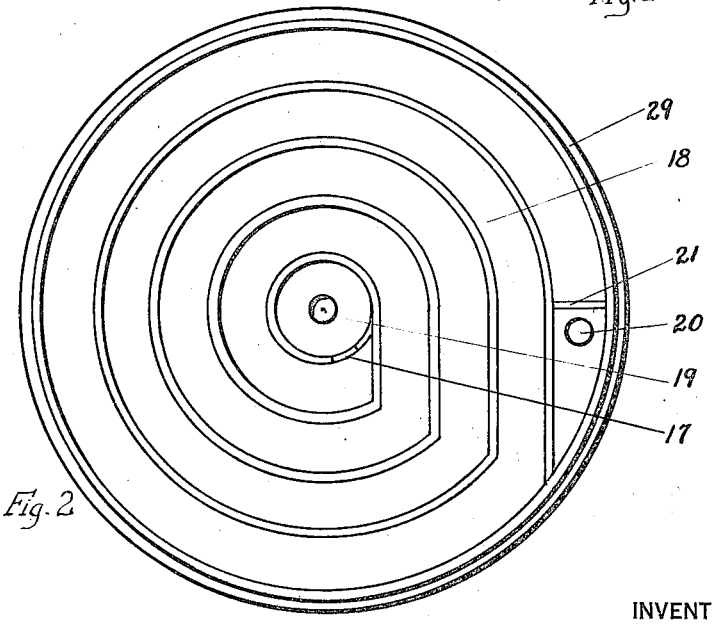

Further objects and advantages of my invention will be apparent from the following drawings and description. In the drawings Fig. 1 is a sectional elevation through an approved form of my invention. Fig. 2 is a plan view of an approved form of precipitating tray. Fig. 3 is a plan view of an approved form of precipitating tray into which has been placed a perforated strip or screen. Fig. 4 is an oblique view of the tray and screen shown in Fig. 3. Fig 5 is a view of a modified form of the perforated strip or screen.

Referring by numerals to the drawings, 10 designates a container preferably cylindrical in shape and preferably surrounded with an annular chamber 11 for the purpose of introducing any suitable heating medium such as hot water, steam, hot gases and the like. At 12 is shown a dirty oil inlet pipe which may be of any suitable form or shape. The oil from this pipe flows down onto the partition or tray 13 which is preferably formed as shown with a bent edge 14. It is evident by this construction that this top tray or partition 13 is readily removable for cleaning purposes and the like. This tray 13 is preferably made conical in shape and preferably has for its central portion a perforated plate or screen 15. The screen 15 serves to remove the coarser particles of foreign matter from the oil. The oil from this screen 15 is preferably introduced at or near the center of the top precipitating tray 16 and flows up over the edge of the dam 17 in the tray 16, around the spiral passage 18, over the transverse dam 21 and out through the opening 20 into the next tray. The passage of the oil over this tray will be from the periphery to the center around the spiral passage 18, the oil leaving the tray at the central opening 19 and passing over the bottom tray from the center to the periphery and out through the opening 20.

As a means of support for these precipitating trays I provide a rack or basket 22, having a curved edge 23 so that the rack, together with the trays, is removable from the container 10 for cleaning purposes. An edge 29 on each of the trays may be used to facilitate stacking.

It is evident that by providing removable closures such as the corks 24, the flow of oil may be reversed over the successive trays, and, in order that the precipitating trays may be made identical, I prefer to provide each one with the two openings 19 and 20 as shown, one at substantially the center of the tray and one at the periphery just beyond the transverse dam 21. I do not wish, however, to limit myself to the use of a plurality of these precipitating trays, since I have found that in many cases one of such trays is sufficient. With my form of construction, however, I may use any number of these trays placed one above the other as shown. The oil from the bottom precipitating tray passes down through the filter bag 25 through which it is strained into the clean oil space 26, having a clean oil outlet such as that shown at 27.

The more surface the oil contacts with in passing over these precipitating trays the more complete is the precipitation and, in order to provide more surface, I may introduce in the spiral passage a bent or corrugated strip 28 of perforated material or screen as shown in Figs. 3 and 4. By this means there is added increased surface, thereby affording better precipitating action.

This perforated strip or screen 28 may be bent or shaped in a number of ways, one of which is shown in Fig. 5. When placed in the passage 18, the portions 30 of this strip so formed would preferably lie on the bottom of the passage.

I claim:

1. In an oil filter, a precipitating tray having a spiral passage therein and a perforated metallic strip adapted to be removably positioned across said passage at an angle to the course of the oil therethrough.

2. In an oil filter, a precipitating tray having a spiral passage therein and a corrugated metallic screen in said passage, crossing same at a plurality of points.

3. In an oil filter, a precipitating tray having a spiral passage therein, a transverse dam at each end of said passage, and a strip of screen folded to cross said passage at a plurality of points.

4. In an oil filter, the combination of a precipitating tray having a spiral passage therein, a folded screen strip substantially longer than said passage, and loosely disposed therein, an opening through the bottom of said tray at substantially the center thereof, a second opening through said tray adjacent the periphery thereof, and removable closures for said openings.

5. In an oil filter, in combination, a precipitating tray having a spiral passage therein, a corrugated metallic screen adapted to be disposed across said passage at several points, an opening through said tray at substantially the center thereof, a second opening through said tray adjacent the periphery thereof, and removable closures for said openings and transverse dams at substantially either end of said passage.

6. In an oil filter, in combination, a container, a spiral-passaged precipitating tray removably suspended within said container, and a metallic screen spirally disposed on said tray, and folded to cross said passage.

7. In an oil filter, in combination, a container, a spiral-passaged precipitating tray, adapted for use with other similar trays removably positioned within said container, means in said tray whereby the direction of current therein may be changed, and a removable partition above said tray having a funnel shaped perforated central portion.

8. In an oil filter, the combination of a container, a spiral-passaged precipitating tray removably suspended within said container, a removable partition above said tray having a funnel shaped perforated central portion and a filter bag removably suspended below said tray.

9. In an oil filter, the combination of a container, a plurality of spiral passaged precipitating trays removably placed within said container and arranged one above the other, one of said trays containing a corrugated screen strip, a plurality of the corrugations extending across said spiral passage, a filter bag removably suspended within said container and below said trays.

10. In an oil filter, a container having an oil inlet at its top and an oil outlet near its bottom, a removable cone-shaped partition within said container, having a perforated central portion, a removable spiral-passaged precipitating tray within said container and located below said partition, and a removable filter bag within said container below said tray.

11. In an oil filter, a spiral-passaged precipitating tray, a metallic screen strip adapted to cross said passage at a plurality of points, thereby causing the oil to successively flow through and over different portions of said strip.

12. In an oil filter, a spiral-passaged precipitating tray, a corrugated wire screen strip placed in the precipitating tray, and so formed and positioned that a portion of the screen is placed across the passage and a portion of the screen rests upon the bottom of the passage.

13. In an oil filter, a container having an inlet substantially at one end, an outlet substantially at the opposite end, and a perforated cone shaped partition, a spiral passaged tray and a filter bag; said partition, tray and bag being disposed one above another, and removably positioned within said container.

CHARLES B. JAHNKE